Patented Apr. 5, 1932

1,851,987

UNITED STATES PATENT OFFICE

JAMES W. SCHWAB, OF GULF, AND CARL E. BUTTERWORTH, OF NEW GULF, TEXAS, ASSIGNORS, BY MESNE ASSIGNMENTS, TO THE KOPPERS COMPANY, A CORPORATION OF DELAWARE

TREATMENT OF WASTE WATERS

No Drawing. Application filed August 22, 1929. Serial No. 387,800.

This invention relates to the treatment of industrial waste waters containing a soluble sulfide, and has for its object the provision of an improved method of treating such waters for substantially eliminating the soluble sulfide. The invention is particularly concerned with the treatment of the waste waters resulting from the mining of sulfur by underground fusion, and in this connection aims to ameliorate the objectionable and offensive characteristics of such waste waters by the removal from solution in the water of all or a substantial part of the dissolved sulfides.

A large and continuous supply of turbid, dark-colored, foul-smelling water is an unavoidable waste product of Frasch process sulfur mining operations. The water is displaced through bleed wells from the lower and cooler portions of the porous sulfur deposit by hot water introduced into the deposit to melt sulfur. This waste or "bleed" water as it is discharged from the bleed wells is free from suspended solids and is yellow in color. On coming in contact with the air, sulfur is precipitated and as the water flows to waste through ditches soluble sulfides present therein react with metal salts in the soil to form colloidal sulfides which give the water a dark color. Hydrogen sulfide is given off by the water as it comes from the bleed well and for long periods of time thereafter. An analysis of bleed water from a deposit which has been mined for several years (average of Gulf bleed water at the present time) is as follows:

*Present Gulf bleed water analysis*

| | Grains per gallon |
|---|---|
| Silica | 3.5 |
| Irion and aluminum oxides | 0.4 |
| Calcium | 34.6 |
| Magnesium | 3.8 |
| Sodium (by difference) | 80.0 |
| Bicarbonate | 5.8 |
| Sulphate | 59.5 |
| Chloride | 116.5 |
| Sulphide | 12.5 |
| Partly oxidized sulphur compounds as thiosulphate | 6.8 | pH value=7.2

At the start of mining operations the bleed water is of the approximate composition of the formation water, of which a typical analysis (Boling formation) is given below:

*Boling formation water analysis*

| | Grains per gallon |
|---|---|
| Silica | 1.2 |
| Iron and aluminum oxides | Trace |
| Calcium | 236.3 |
| Magnesium | 27.8 |
| Sodium (by difference) | 1364. |
| Bicarbonate | 11.8 |
| Sulphate | 122.1 |
| Chloride | 2412.1 |
| Sulphide | 41.6 |
| Total solids | 4306. |
| Specific gravity | 1.052 | pH value=6.8

As the formation water is diluted by the fresh water added in mining operations and is displaced through the bleed wells, the concentration of solids in the water decreases until after several years operation the bleed water is of a composition approximating that of present Gulf bleed water. While the total concentration of soluble salts present in the bleed water decreases with the years of operation, the decrease in the soluble sulphide content of the water seems to reach a minimum value of 12 to 16 grains per gallon. This condition is probably due to the solution of sulphur in the hot alkaline water pumped into the deposit for melting the sulfur.

The disposal of bleed water to waste has, in the past, given cause for complaint by property owners adjacent to the streams into which the water drained. The present invention contemplates a simple, inexpensive and effective treatment of such bleed water whereby the water is substantially freed of its objectionable and offensive contaminants.

The invention is based on our discovery that sulfides are effectively removed from solution in bleed water by carbon dioxide. We have further discovered that complete removal of the sulfides by carbon dioxide is not necessary, since treatment of the water with amounts of carbon dioxide too small to displace all of the sulfides leaves the sulfides remaining in solution in the water in the form of compounds easily removed by aeration. Our invention accordingly contemplates the treatment of bleed water, or similar waste waters, with carbon dioxide in such amount as to effect the removal from solution in the water of all or a substantial part of the dissolved sulfides. The invention further contemplates aeration of the water, following the carbon dioxide treatment, for completing the removal from solution of dissolved sulfides and/or for removing excess of carbon dioxide.

Soluble sulfides are probably present in bleed water as dissolved hydrogen sulfide, calcium hydrosulfide and calcium polysulfide. The decrease in hydrogen-ion concentration accompanying evolution of hydrogen sulfide indicates the presence of hydrosulfides. The yellow color of the water and the loss of this yellow color accompanied by precipitation of sulfur, resulting from the addition of acid to the bleed water, indicates the presence of polysulfides. The action of carbon dioxide when brought in contact with bleed water appears to be that of a weak acid. In any event, we have found carbon dioxide a very effective agent for removing sulfides from solution in bleed water, hydrogen sulfide and sulfur being the end products of the reaction. Carbon dioxide appears also to have a preferential action for polysulfides. The fact that carbon dioxide, a gas, dissolves in the bleed water to form a weak acid which reacts rapidly with sulfides, but slowly, if at all, with other compounds present in the water, results in the carbon dioxide treatment taking place at an almost constant and relatively low hydrogen-ion concentration, and subsequent aeration leaves the water sufficiently alkaline for disposal to waste.

In the practice of the invention, the carbon dioxide may be derived from any appropriate source. It is not necessary that it be pure, but, on the contrary, for economic reasons, it is our preferred practice to use a waste gas containing a suitable percentage of carbon dioxide. Thus the products of combustion of fuel burners may be advantageously used. In our investigations and in practice we have obtained satisfactory results with the flue gas from the power plants required to heat water for sulfur mining operations by underground fusion. Such flue gas is available at sulfur mining properties in adequate quantities for bleed water treatment and contains from 7 to 16% of carbon dioxide.

The action of flue gas alone on bleed water rapidly removes all soluble sulfides in the water. Under favorable contact conditions two to six cubic feet of flue gas are required per gallon of present Boling bleed water, depending on the nature and time of contact between the water and the gas. It is not necessary to effect complete removal of the sulfides by the action of the flue gas. If the bleed water is first treated with about one cubic foot of flue gas per gallon of water (under conditions similar to those in which five cubic feet of flue gas alone are required for complete sulfide removal) and the so-treated water is then aerated, sulfide removal proceeds with rapidity in both operations and is complete after the aeration. Flue gas and air requirements will vary with the character and amount of the dissolved sulfides present in the bleed water and with the type and size of the equipment employed to effect contact between the water and the flue gas and air.

An effective means of securing maximum contact between flue gas, or other gas containing carbon dioxide, and bleed water, as well as between air and bleed water, is an ordinary gas absorbing tower packed with grids made of wooden slats, ceramic tower packing or other suitable material for exposing large surface area. The bleed water is distributed evenly on the top of the tower packing by sprays or other suitable means and trickles down over the tower packing, exposing the water in thin films to the flue gas which is introduced at the bottom of the tower and passes up through the tower counter-current to the bleed water and discharges to the atmosphere from a stack placed on top of the tower.

In the treatment of present Boling bleed water, it has been found that a gas absorbing tower of the type just described, about forty-five feet in height, gives satisfactory results when treating the water with flue gas, and rates of up to seven gallons of bleed water per minute per square foot of cross-sectional area can be used. The height of the treatment tower and rate of flow of bleed water therethrough will vary with the character of the water, the nature of the tower packing, and the volume and carbon dioxide content of the treatment gas.

When the bleed water is first subjected to the carbon dioxide treatment and then to aeration, two treatment towers may be employed in series, in the first of which the bleed water is subjected to the action of carbon dioxide, and in the second of which the water treated in the first tower is subjected to aeration. If desired, the complete double treatment operation may be conducted in a single tower divided into two sections, in one of which the carbon dioxide treatment takes place and in the other of which aeration takes place. Aeration, after a sufficient carbon dioxide treatment is rapid. In the treatment of Boling bleed water, we have obtained satisfactory results with twenty cubic feet of air per gallon of bleed water for the aeration treatment.

Various other means of introducing carbon dioxide, and air when used, into the bleed water, or other waste water being treated, may be used. We have obtained satisfactory results in the flue gas and air treatment of Boling bleed water by passing the flue gas through a 15-foot solid column of water, the flue gas being introduced through a perforated pipe positioned in the bottom of the treatment tank. The bleed water may be passed through such a treatment tank continuously, either counter-current to the flue gas or concurrent with the flue gas. Subsequent aeration to remove remaining sulfides is more rapid, however, when it is effected in a gas absorption tower, such as hereinbefore described, than when air is passed through a solid column of the water.

The following tables illustrate various applications of the invention to the treatment of bleed water. The 44-foot treatment tower was made from a 44-foot length of 24-inch diameter pipe, within which were arranged six bundles of twenty grids each. Each bundle was six feet long, and the bundles were spaced one foot apart. Each grid was made of sixteen wooden strips four inches wide and about one-fourth inch thick set on edge and spaced one inch apart and notched on the lower edges, and each grid was staggered with respect to the grid above it and below it. The 20-foot treatment tower was of similar construction, but contained only two bundles of grids, each bundle six feet long.

In the tables, the columns headed "A" indicate the gallons of bleed water treated per minute, and the columns headed "B" indicate the gallons of bleed water treated per square foot of cross sectional area per minute. The columns headed "C" indicate the cubic feet of flue gas used per gallon of water treated, and the columns headed "D" indicate the per cent of carbon dioxide in the flue gas. The grains of soluble sulfide in the water were determined by iodine titration, and the sulfide in the discharge water was determined by lead acetate test. Air, flue gas and water were measured by means of suitable orifice meters.

TABLE I.—*Flue gas treatment of bleed water*

| Bleed water treated gallons | | Flue gas | | Grains per gallon soluble sulfides in water at varying distances from discharge point in 44-ft. tower | | | | | | | Sulfide in water at discharge point of tower |
|---|---|---|---|---|---|---|---|---|---|---|---|
| A | B | C | D | 44 ft. | 37 ft. | 30 ft. | 23 ft. | 16 ft. | 9 ft. | 0 ft. | |
| 9.4 | 3 | 2 | 9.6 | 32.7 | 14.7 | 10.4 | 5.2 | 1.6 | 0.2 | 0.0 | Bare trace. |
| 22.0 | 7 | 3 | 10.2 | 33.1 | 11.6 | 8.9 | 3.8 | 1.6 | 0.5 | 0.2 | Trace. |
| 22.0 | 7 | 5 | 10.2 | 32.2 | 9.4 | 6.8 | 2.2 | 0.3 | 0.1 | 0.0 | Barest trace. | pH determinations at varying distances from discharge point of tower

| A | B | C | D | 44 ft. | 37 ft. | 30 ft. | 23 ft. | 16 ft. | 9 ft. | 0 ft. |
|---|---|---|---|---|---|---|---|---|---|---|
| 9.4 | 3 | 2 | 9.6 | 7.0 | 7.5 | 7.5 | 7.4 | 7.3 | 7.3 | 6.9 |
| 22.0 | 7 | 3 | 10.2 | 6.9 | 7.5 | 7.5 | 7.4 | 7.3 | 7.1 | 7.0 |
| 22.0 | 7 | 5 | 10.2 | 6.9 | 7.6 | 7.5 | 7.4 | 7.1 | 6.9 | 6.9 |

TABLE II.—*Bleed water treatment with flue gas followed by aeration*

Flue gas passed through 44-ft. tower counter-current to bleed water

| Bleed water treated gallons | | Flue gas | | Grains per gallon soluble sulfides in water at varying distances from discharge point in tower | | | | | | | pH value water at discharge of tower |
|---|---|---|---|---|---|---|---|---|---|---|---|
| A | B | C | D | 44 ft. | 37 ft. | 30 ft. | 23 ft. | 16 ft. | 9 ft. | 0 ft. | |
| 9.4 | 3 | 0.5 | 9.7 | 27.6 | 19.8 | 15.9 | 13.9 | 12.0 | 7.7 | 7.7 | 7.3 |
| 22.0 | 7 | 0.75 | 10.0 | 28.1 | 16.8 | 14.8 | 10.5 | 7.4 | 6.4 | 6.5 | 7.3 |

Air passed counter-current to bleed water, previously treated with flue gas in 44-ft. tower, in 20-ft. tower

| Cubic feet air per gallon water | Grains per gallon soluble sulfides in water at varying distances from discharge point in tower | | | pH value water as discharged from tower | Sulfide in water after discharge from aerating tower |
|---|---|---|---|---|---|
| | 20 ft. | 11 ft. | 0 ft. | | |
| 20 | 7.7 | 0.0 | 0 | 7.7 | Barest trace. |
| 20 | 6.5 | 0.2 | 0 | 7.7 | Barest trace. |

TABLE III.—*Bleed water treatment with flue gas followed by aeration*

Flue gas passed through 20-ft. tower counter-current to bleed water

| Bleed water treated gallons | | Flue gas | | Grains per gallon soluble sulfides in water at varying distances from discharge point in tower | | | pH value water at discharge of tower |
|---|---|---|---|---|---|---|---|
| A | B | C | D | 20 ft. | 11 ft. | 0 ft. | |
| 9.4 | 3 | 0.7 | 9.1 | 30.1 | 16.9 | 10.9 | 7.5 |
| 22.0 | 7 | 1.0 | 9.8 | 28.9 | 16.4 | 12.8 | 7.4 |

Air passed counter-current to bleed water, previously treated with flue gas in 20-ft. tower, in 44-ft. tower

| Cubic ft. air per gallon water | Grains per gallon soluble sulfides in water at varying distances from discharge point in 44-ft. tower | | | | | | | pH value water as discharged from tower | Sulfide in water after discharge from aerating tower |
|---|---|---|---|---|---|---|---|---|---|
| | 44 ft. | 37 ft. | 30 ft. | 23 ft. | 16 ft. | 9 ft. | 0 ft. | | |
| 20 | 10.9 | 1.7 | 1.0 | 0.5 | 0.3 | 0.3 | 0.2 | 8.0 | Barest trace. |
| 20 | 12.8 | 1.1 | 0.7 | 0.6 | 0.5 | 0.2 | 0.2 | 7.7 | Barest trace. |

TABLE IV.—*Bleed water treatment with flue gas followed by aeration*

Flue gas passed through solid column of bleed water in 12-in. pipe 15-ft. in length

| Bleed water treated gallons | | Flue gas | | Time of contact water and gas in minutes | Flue gas passed counter-current with water | Flue gas passed concurrent with water | Grains per gallon soluble sulfides in water | |
|---|---|---|---|---|---|---|---|---|
| A | B | C | D | | | | In | Out |
| 9.4 | 3 | .25 | 8.5 | 9.5 | No | Yes | 32.0 | 19.8 |
| 22.0 | 7 | .60 | 8.3 | 4.0 | No | Yes | 29.4 | 14.5 |
| 9.4 | 3 | .30 | 8.8 | 9.5 | Yes | No | 34.2 | 19.0 |
| 22.0 | 7 | .40 | 9.2 | 4.0 | Yes | No | 32.4 | 17.0 |

Air passed counter-current to bleed water, previously treated with flue gas in 15-ft. length of 12-in. pipe, in 44-ft. tower

| Cubic ft. air per gallon water | Grains per gallon soluble sulfides in water at varying distances from discharge point in 44-ft. tower | | | | | | | pH value water as discharged from tower | Sulfide in water after discharge from aerating tower |
|---|---|---|---|---|---|---|---|---|---|
| | 44 ft. | 37 ft. | 30 ft. | 23 ft. | 16 ft. | 9 ft. | 0 ft. | | |
| 20 | 19.8 | | 2.3 | 0.4 | 0.2 | 0.0 | 0.0 | 7.3 | Barest trace. |
| 20 | 14.5 | | 0.6 | 0.6 | 0.4 | | 0.3 | 7.1 | Trace. |
| 20 | 19.0 | | | | | | 0.0 | | Barest trace. |
| 20 | 17.0 | | | | | | 0.2 | | Barest trace. |

The chief object sought in the treatment of bleed water is the removal from solution of the soluble sulphides, so that the water can be discharged to waste in an unoffensive form. Since hydrogen sulfide gas is evolved from the water by the treatment process of the invention, the process is mainly adapted for those localities where hydrogen sulfide may be safely discharged into the atmosphere, otherwise appropriate means should be provided for collecting or suitably disposing of the evolved hydrogen sulfide.

In treating bleed water, it is desirable that alkaline end products be neutralized as formed in order to speed up the rate at which sulfides are removed. Aeration alone does not rapidly remove all of the soluble sulfides from bleed water. Alkaline end products (calcium hydroxide) probably slow up the rate of reaction before all hydrosulfides are broken up, if hydrosulfides are present in large concentrations. However, the chief reason for slow sulfide removal from bleed water by aeration alone is the presence of relatively large quantities of polysulfides. Reactions set up by aeration alone will break up polysulfides, but such reactions are very slow and ineffective as compared with the carbon dioxide treatment for removing polysulfides from bleed water.

Carbon dioxide rapidly and completely removes al soluble sulfides from bleed water. Excess carbon dioxide is relatively inert and does not react with bicarbonates present in the water to destroy bicarbonate alkalinity. Thus, the carbon dioxide treatment of bleed water leaves the water in such condition that very little aeration drives off excess gas and leaves the water with a desirable hydrogen-ion concentration for disposal to waste. The hydrogen-ion concentration of the bleed water remains approximately constant during the carbon dioxide treatment. Subsequently aeration appreciably lowers the hydrogen-ion concentration. Thus, for example, in the treatment of present Boling bleed water having a pH value of about 6.8–7.2, the carbon dioxide treatment will not appreciably alter the hydrogen-ion concentration, but the final aerated sulfur-free water will have a pH value around 7.5–8, and will therefore be sufficiently alkaline for discharge to waste.

We claim:—

1. The method of treating industrial waste water containing a soluble sulfide which comprises subjecting the water in its natural condition to the action of carbon dioxide and thereby effecting the removal from solution in the water of all or a substantial part of the dissolved sulfide.

2. The method of treating industrial waste water containing a soluble sulfide which comprises subjecting the water in its natural condition to the action of a waste gas containing a substantial percentage of carbon dioxide and thereby effecting the removal from solution in the water of all or a substantial part of the dissolved sulfide.

3. The method of treating industrial waste water containing a soluble sulfide which comprises subjecting the water to the action of carbon dioxide, and subjecting the resulting so-treated water to aeration, whereby the soluble sulfide is substantially completely removed from solution in the water.

4. The method of treating industrial waste water containing a soluble sulfide which comprises subjecting the water to the action of a waste gas containing a substantial percentage of carbon dioxide, and subjecting the resulting so-treated water to aeration, whereby the soluble sulfide is substantially completely removed from solution in the water.

5. The method of treating bleed water from sulfur mining operations which comprises subjecting the water in its natural condition to the action of a gas containing a substantial percentage of carbon dioxide and thereby effecting the removal from solution in the water of all or a substantial part of the dissolved sulfide.

6. The method of treating industrial waste water containing a soluble sulfide and having a pH value of about 6.8 to 7.2 which comprises subjecting the water to the action of carbon dioxide and thereby effecting the removal from solution in the water of all or a substantial part of the dissolved sulfide while maintaining the pH value of the water approximately constant.

7. The method of treating industrial waste water having a relatively low hydrogen-ion concentration and containing a soluble sulfide which comprises subjecting the water to the action of carbon dioxide and thereby effecting the removal from solution in the water of a substantial part of the dissolved sulfide while maintaining the hydrogen-ion concentration of the water approximately constant, and subjecting the resulting so-treated water to aeration in consequence of which the water becomes sufficiently alkaline for discharge to waste.

8. The method of treating bleed water from sulfur mining operations which comprises subjecting the water to the action of a gas containing a substantial percentage of carbon dioxide, and subjecting the resulting so-treated water to aeration, whereby the soluble sulfides are substantially completely removed from solution in the water.

9. The method of treating bleed water from sulfur mining operations which comprises subjecting the water to the action of a gas containing a substantial percentage of carbon dioxide and thereby effecting the removal from solution in the water of all or a substantial part of the dissolved sulfide while maintaining the hydrogen-ion concentration of the water approximately constant, and subjecting the resulting so-treated water to aeration in consequence of which any sulfide still remaining in solution and excess of carbon dioxide are removed and the water becomes sufficiently alkaline for discharge to waste.

In testimony whereof we affix our signatures.

JAMES W. SCHWAB.
CARL E. BUTTERWORTH.